Oct. 11, 1932.   P. A. FISCHER   1,882,133
NAPKIN AND METHOD OF MAKING IT
Filed May 27, 1930    2 Sheets-Sheet 1
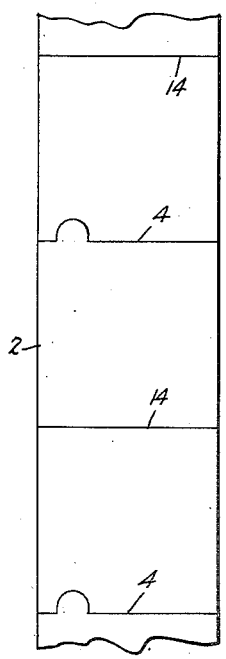
Fig. 1.   Fig. 8.
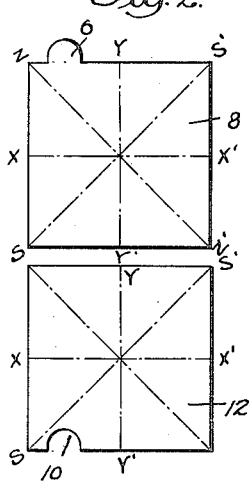
Fig. 2.   Fig. 3.
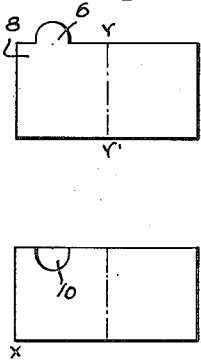
Fig. 4.   Fig. 6.
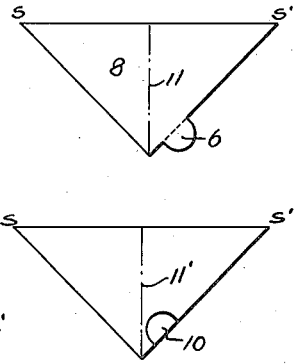
Fig. 5.   Fig. 7.
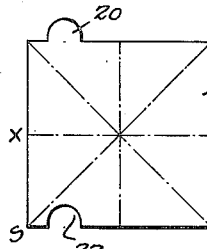
Fig. 9.
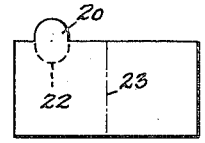
Fig. 10.
Fig. 11.
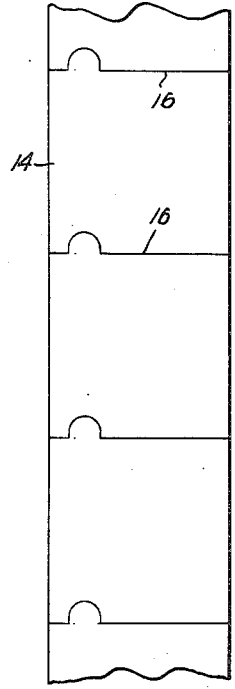
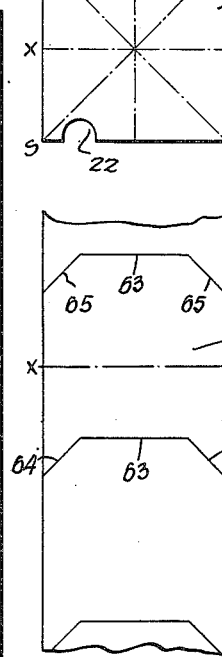
Fig. 24.
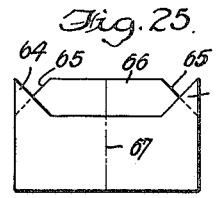
Fig. 25.
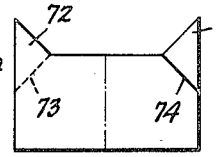
Fig. 27.
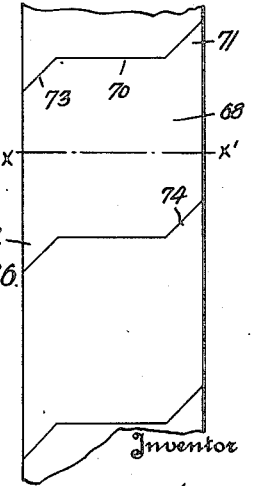
Fig. 26.
Inventor
Philip A. Fischer
By Faber Pedersen
Attorneys.

Oct. 11, 1932. P. A. FISCHER 1,882,133
NAPKIN AND METHOD OF MAKING IT
Filed May 27, 1930 2 Sheets-Sheet 2
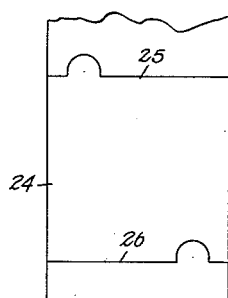
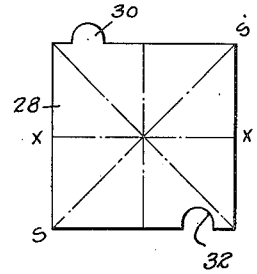
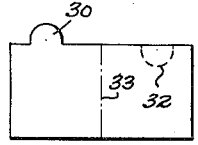
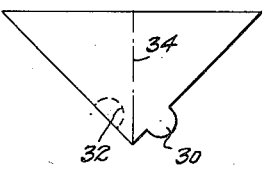
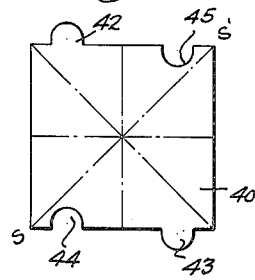
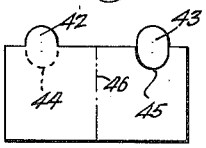
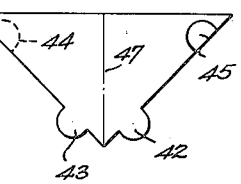
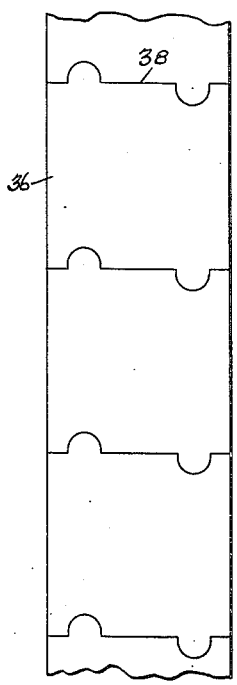
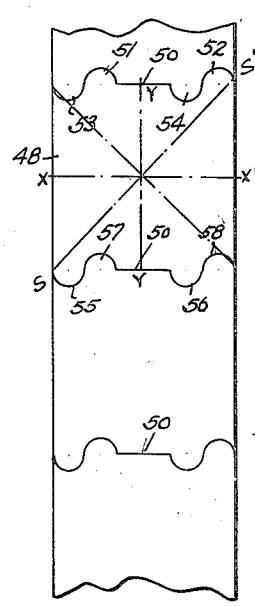
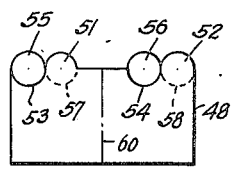
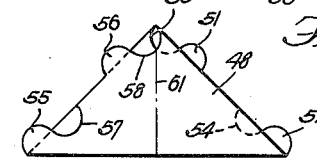
Inventor
Philip A. Fischer
By Fisher & Pedersen
Attorneys Patented Oct. 11, 1932

1,882,133

UNITED STATES PATENT OFFICE

PHILIP A. FISCHER, OF NEW YORK, N. Y.

NAPKIN AND METHOD OF MAKING IT

Application filed May 27, 1930. Serial No. 456,252.

This invention resides in a method of making a paper napkin, and in the resulting product.

According to this invention, the edge of the napkin is modified, so as to provide exposed gripping points which may be grasped by the user in opening the napkin. The modification of the edge of the napkin is effected by cutting a cloth or paper strip successively in such a way that there is no wastage of paper.

The modified edge of the napkin may be provided with one or more projecting portions or tabs, furnishing the exposed gripping points. Or, the napkin may be provided with one or more cut-away portions, which may be in the form of notches, which, when the napkin is folded, uncover or expose a portion of the underlying edge of the napkin to provide an exposed gripping point which may be grasped by the user in unfolding the napkin.

In my Patent No. 1,844,468 dated February 9, 1932, which was co-pending herewith, there are disclosed other ways of making a paper napkin so that it may be readily unfolded by the user.

One of the important features of the invention is a method of cutting a continuous strip of paper or cloth, so as to provide tabs on one napkin and correspondingly shaped cut-away portions or indentations on the adjacent napkin, without any wastage of paper. In other words, the strip of paper is cut on an irregular line, any given irregularity resulting in the simultaneous formation in the adjacent edges of corresponding napkins a projecting tab, and a cut-away portion or indentation, respectively.

The invention will be more fully described in connection with the accompanying drawings illustrating several ways of carrying out the invention. In these drawings, Fig. 1 shows a method of cutting the strip;

Figs. 2 and 3 show the two types of napkins resulting from this method of cutting;

Figs. 4 and 5 show the napkin of Fig. 2 in different folded positions;

Figs. 6 and 7 show the napkin of Fig. 3 in different folded positions;

Fig. 8 shows another method of cutting the strip;

Fig. 9 shows the napkin resulting from this method of cutting;

Figs. 10 and 11 show the napkin of Fig. 9 folded in different ways;

Fig. 12 shows still another method of cutting the strip;

Fig. 13 shows the resulting napkin;

Figs. 14 and 15 show the napkin of Fig. 13 folded in different ways;

Fig. 16 shows still another method of cutting the continuous strip;

Fig. 17 shows the resulting napkin; and

Figs. 18 and 19 show the napkin of Fig. 17 folded in different ways;

Fig. 20 shows another method of cutting the strip;

Figs. 21, 22 and 23 show different methods of folding the resulting napkin;

Fig. 24 shows another method of cutting the strip; and

Fig. 25 shows the resulting napkin folded once;

Fig. 26 shows still another method of cutting the strip; and

Fig. 27 shows the resulting napkin folded once.

Referring now to these drawings, in which similar reference characters indicate similar parts, the continuous strip 2, of paper or the like, is cut transversely on an irregular line 4, the irregularity being of such a shape as to form a tab 6 in the napkin 8, and a correspondingly shaped cut-out 10 in the napkin 12.

The next cut on the strip is a straight line 14, while the cut beyond that is another irregular line 4.

There are thus formed two napkins 8 and 12, one of which has a tab 6, and the other of which has a cut-out 10.

The napkin in any of the figures on the drawings may be folded in any desired manner. Several possible methods of folding will be described, but it should be understood that these methods of folding are not restrictive in any sense, and that the user or manufacturer can fold the napkin in any way that he cares to. In Fig. 4, for example, the napkin has been folded once about the X axis. It could be folded again about the Y axis, which would make it just one-fourth the size of the spread out napkin of Fig. 2.

The napkin shown in Fig. 5 has been folded once on the diagonal axis S S'.

The napkin shown in Fig. 3 is shown in Fig. 6 as folded once about the axis X X'. This same napkin is shown in Fig. 7 as folded once about the line S S'.

The napkins of Figs. 5 and 7 can, of course, be folded again, if desired, about the dot and dash lines 11 or 11'.

In Fig. 8 the continuous strip 14 is cut successively along the irregular lines 16, to provide one edge of the resulting napkin 18 with a tab 20 and with an indentation 22. When folded once about the X axis, this napkin would appear as in Fig. 10, while if folded about the axis S S', would appear as in Fig. 11. The napkins of Figs. 10 and 11 could, of course, be folded again if desired, on lines 23 or 23' respectively.

In Fig. 12 the continuous strip 24 is cut along successive irregular lines 25 and 26, thus providing the resulting napkin 28 with a tab 30 in one edge and a cut-out 32 in the opposite edge, the tab and cut-out being in staggered relation. When folded once about the X axis, this napkin would appear as in Fig. 14, while if folded once about the axis S S', would appear as in Fig. 15. The napkin of Figs. 14 and 15 could, of course, be folded again if desired, along the lines 33 or 34.

In Fig. 16, the continuous strip 36 is cut along successive irregular lines 38, which will give the napkin 40 as shown in Fig. 17, which has tabs 42 and 43 in opposite edges of the napkin and cut-outs 44 and 45 in opposite edges, the tabs being staggered with relation to each other, and the cut-outs being staggered in relation to each other. The napkin 40, when folded about the axis S S' would appear as in Fig. 19.

The napkins of Figs. 18 and 19 could be folded again about the lines 46 or 47.

In Fig. 20 the continuous strip 48 is cut along successive irregular lines 50 to provide tabs 51 and 52 and cut-outs 53 and 54 in one edge of the napkin, while the other edge is provided with tabs 55 and 56 and with cut-outs 57 and 58. The tabs on one side of the napkin, with respect to a vertical axis, are in staggered relation with each other. So also with the indentations on one side of the napkin.

The napkin 48, when folded about the X axis, the lower part of the napkin being folded underneath, would appear as in Fig. 22. If folded about the Y axis, it would appear as in Fig. 23.

The napkins of Figs. 21, 22 and 23 could be folded again if desired about the lines 59, 60 or 61, respectively.

Fig. 24 shows a paper strip 62 cut along the irregular line 63, to provide projecting tabs 64 in one corner of the napkin and cut-off corners 65. The napkin, when folded once about the X axis, would appear as in Fig. 25. In this case the projections 64 furnish gripping points for opening the napkin, while most of one edge, as at 66, is exposed for opening the napkin. This napkin can be folded again about the line 67, if desired. The napkin formed by cutting the strip along line 63, in Fig. 24 can be folded about other axes as will be understood.

In Fig. 26 the paper strip 68 is cut along successive irregular lines 70 to provide projecting tabs 71 and 72 in opposite corners of the napkin and with cutaway corners 73 and 74. This napkin, when folded once about the X axis, would appear as in Fig. 27.

While the invention has been described in connection with a paper napkin, it is, of course, not limited thereto but cloth or other suitable material might be used. While specific methods of cutting the continuous strip have been described, it should be understood that the precise shape and placement of the tabs and indentations may be varied, within the teachings of this invention. It should also be understood that the several different forms of napkins shown may be folded in any desired manner.

I claim as my invention:

1. A method of making paper napkins, comprising cutting a strip of paper transversely on a broken line, whereby a projecting portion is formed along an edge of one napkin, and an indentation of corresponding shape is formed in the adjacent edge of the adjoining napkin, and folding the napkin so that either the tab or the indentation provide exposed gripping points which may be used for opening the napkin.

2. A paper napkin, having a tab projecting from one edge, which, when the napkin is folded, forms a projecting fingerpiece which is readily grasped by the user for opening the napkin.

3. A paper napkin, having a tab projecting from one edge and an indentation in another edge, the tab, where the napkin is folded, providing a projecting fingerpiece which is readily grasped by the user for opening the napkin.

4. A paper napkin, having a tab projecting from one edge and an indentation in the opposite edge, staggered with respect to the tab, both the tab and the indentation providing exposed gripping points which may be readily grasped by the user for opening the napkin.

5. A paper napkin, having a tab projecting from one edge and an indentation in another edge, staggered with respect to the tab, the tab and the indentation being of substantially the same shape, the tab, where the napkin is folded, providing a projecting fingerpiece which is readily grasped by the user for opening the napkin.

6. A method of making paper napkins, comprising the steps of successively cutting a web of paper transversely, to provide staggered tabs and correspondingly staggered notches, and folding the napkins so that the tabs and notches provide exposed gripping points which may be grasped by the user for unfolding the napkin.

7. A method of making paper napkins, comprising the steps of successively cutting a web of paper transversely, for providing staggered tabs and correspondingly staggered notches with no wastage of paper, and folding the napkins so that the tabs and notches provide exposed gripping points which may be grasped by the user for unfolding the napkin.

In testimony whereof I affix my signature.

PHILIP A. FISCHER.